United States Patent
Coleman et al.

(10) Patent No.: US 11,350,147 B2
(45) Date of Patent: May 31, 2022

(54) SYSTEM AND METHOD FOR IDENTIFYING LEAKED DATA AND ASSIGNING GUILT TO A SUSPECTED LEAKER

(71) Applicant: LiveRamp, Inc., San Francisco, CA (US)

(72) Inventors: Arthur Coleman, Carmel Valley, CA (US); Chivon Powers, Burlingame, CA (US); Christina Tsz Ling Leung, Foster City, CA (US); Martin Rose, Superior, CO (US); Matt LeBaron, San Juan Bautista, CA (US)

(73) Assignee: LiveRamp, Inc., San Francisco, CA (US)

( * ) Notice: Subject to any disclaimer, the term of this patent is extended or adjusted under 35 U.S.C. 154(b) by 478 days.

(21) Appl. No.: 16/494,022

(22) PCT Filed: Mar. 9, 2018

(86) PCT No.: PCT/US2018/021853
§ 371 (c)(1),
(2) Date: Sep. 13, 2019

(87) PCT Pub. No.: WO2018/169802
PCT Pub. Date: Sep. 20, 2018

(65) Prior Publication Data
US 2020/0092595 A1  Mar. 19, 2020

Related U.S. Application Data (60) Provisional application No. 62/472,853, filed on Mar. 17, 2017.

(51) Int. Cl.
*H04N 21/25* (2011.01)
*H04N 21/258* (2011.01)
(Continued)

(52) U.S. Cl.
CPC ........ *H04N 21/2585* (2013.01); *G06F 21/16* (2013.01); *H04N 21/23418* (2013.01); *H04N 21/25891* (2013.01); *H04N 21/8358* (2013.01)

(58) Field of Classification Search
None
See application file for complete search history.

(56) References Cited

U.S. PATENT DOCUMENTS

| | | | | |
|---|---|---|---|---|
| 2009/0125607 A1* | 5/2009 | Rhoads | ............... | H04N 1/32144 707/E17.014 |
| 2014/0007246 A1* | 1/2014 | Nelson | .................... | H04L 63/12 726/26 |
| 2017/0329943 A1* | 11/2017 | Choi | ....................... | G06T 1/005 |

* cited by examiner

*Primary Examiner* — Cai Y Chen (57) ABSTRACT

A system and method for identifying a leaked data file and assigning guilt to one or more suspected leakers proceeds through a plurality of levels. At a first level, primary watermark detection occurs. Data is inserted into a subset of data to determine correlation with data in the suspected leaked file. The guilt probability that results is then weighted based on the number of bits matched. In a second level, another search process is performed for detecting additional salt-related patterns. The guilt score is then computed for every detected recipient identifier for the suspected leaked data file, and the relative guilt of these recipients is weighted. In a third layer, the statistical distribution of data in the suspected leaked file is compared with that of corresponding data in the reference files. After this layer is complete, the average of guilt scores across each of the layers is calculated.

19 Claims, 4 Drawing Sheets

| bit position | 1 | 1 | 2 | 2 | 3 | 3 | 4 | 4 | 5 | 5 | 6 | 6 | 7 | 7 | 8 | 8 | 9 | 9 | 10 | 10 | 11 | 11 |
|---|---|---|---|---|---|---|---|---|---|---|---|---|---|---|---|---|---|---|---|---|---|---|
| bit value | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| bit count | 64 | 275 | 68 | 0 | 153 | 0 | 49 | 189 | 366 | 0 | 29 | 0 | 19 | 89 | 17 | 62 | 61 | 225 | 0 | 2 | 81 | 0 |
| % bit value | 0.19 | 0.81 | 1 | 0 | 1 | 0 | 0.21 | 0.79 | 1 | 0 | 1 | 0 | 0.18 | 0.82 | 0.22 | 0.8 | 0.21 | 0.79 | 0 | 1 | 1 | 0 |
| detected bits | 1 | | 0 | | 0 | | unknown | | 0 | | 0 | | 1 | | unknown | | unknown | | 1 | | 0 | |

(51) Int. Cl.
*G06F 21/16* (2013.01)
*H04N 21/234* (2011.01)
*H04N 21/8358* (2011.01)

| bit position | 1 | 1 | 2 | 2 | 3 | 3 | 4 | 4 | 5 | 5 | 6 | 6 | 7 | 7 | 8 | 8 | 9 | 9 | 10 | 10 | 11 | 11 |
|---|---|---|---|---|---|---|---|---|---|---|---|---|---|---|---|---|---|---|---|---|---|---|
| bit value | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| bit count | 64 | 275 | 68 | 0 | 153 | 0 | 49 | 189 | 0 | 366 | 0 | 29 | 19 | 89 | 17 | 62 | 61 | 225 | 0 | 2 | 0 | 81 |
| % bit value | 0.19 | 0.81 | | | | | 0.21 | 0.79 | | | | | 0.18 | 0.82 | 0.22 | 0.8 | 0.21 | 0.79 | | | | |
| detected bits | 1 | | 0 | | 0 | | unknown | | 0 | | 1 | | unknown | | unknown | | unknown | | 1 | | 0 | |

FIG. 1

Wild File attribute 1

$p(X^2) > .05$
ATTRIBUTE IN COMMON

Recipient A attribute 1-match 1

Recipient A attribute 1-match 2

$p(X^2) > .05$
ATTRIBUTE IN COMMON

Recipient A attribute 1-match 3

$p(X^2) > .05$
NO MATCH

Wild File

| | Driver | Yogi | Parent |
|---|---|---|---|
| Joe S. | 0 | 1 | 1 |
| Jim B. | 1 | 1 | 1 |
| Ray K. | 1 | 0 | 1 |

Recipient A

| | Sex | Parent | Yogi |
|---|---|---|---|
| Ray K. | M | 1 | 0 |
| Jim B. | M | 0 | 1 |
| Joe S. | M | 1 | 0 |

Recipient B

| | Driver | Parent | Yogi |
|---|---|---|---|
| Seth B. | 0 | 1 | 1 |
| Ray K. | 1 | 1 | 0 |
| Cam R. | 1 | 1 | 0 |

Recipient C

| | Age | Techie | Parent |
|---|---|---|---|
| Joe S. | 24 | 0 | 1 |
| Seth B. | 22 | 1 | 0 |
| Ray K. | 25 | 1 | 0 |

| | Matched Cells | Possible Cells | % Overlap |
|---|---|---|---|
| Recipient A | 4 | 6 | .66 |
| Recipient B | 3 | 3 | 1.00 |
| Recipient C | 1 | 2 | .50 |

FIG. 4

| Wild File | Driver | Yogi | Parent |
|---|---|---|---|
| Joe S. | 0 | 1 | 1 |
| Jim B. | 1 | 1 | 1 |
| Ray K. | 1 | 0 | 1 |
| Weight | 1 | 1.25 | 1 |

| Recipient A | Sex | Parent | Yogi |
|---|---|---|---|
| Ray K. | M | 1 | 0 |
| Jim B. | M | 0 | 1 |
| Joe S. | M | 1 | 0 |
| Weighted Count | --- | 2 | 2.5 |

| Recipient B | Driver | Parent | Yogi |
|---|---|---|---|
| Seth B. | 0 | 1 | 1 |
| Ray K. | 1 | 1 | 0 |
| Cam R. | 1 | 1 | 0 |
| Weighted Count | 1 | 1 | 1.25 |

| Recipient C | Age | Techie | Parent |
|---|---|---|---|
| Joe S. | 24 | 0 | 1 |
| Seth B. | 22 | 1 | 0 |
| Ray K. | 25 | 1 | 0 |
| Weighted Count | --- | --- | 1 |

| | Matched Cells | Possible Cells | Weighted Score |
|---|---|---|---|
| Calculation | Sum of weighted counts | Total Possible counts | (Matched/Possible) *100 |
| Recipient A | 4.5 | 6 | 75 |
| Recipient B | 3.25 | 3 | 108 |
| Recipient C | 1 | 2 | 50 |

FIG. 5

SYSTEM AND METHOD FOR IDENTIFYING LEAKED DATA AND ASSIGNING GUILT TO A SUSPECTED LEAKER

TECHNICAL FIELD

The field of the invention is the verification of the ownership of data to determine if data has been inappropriately copied or used and, if so, identifying the party who has inappropriately copied or used the data.

BACKGROUND ART

References mentioned in this background section are not admitted to be prior art with respect to the present invention.

Data leakage may be defined as the surreptitious use of data by someone other than an owner or authorized user. Data leakage is estimated to be a multi-trillion dollar problem by 2019. Data leakage solutions, which currently represent about $1 billion per year in lost sales, have existed for some time with respect to certain types of data. Solutions have existed for asserting ownership of graphical, video, audio, or document (i.e., text or .pdf) data once that data is actually exposed in the clear, outside the owner's firewall. Organizations use these watermarking solutions, as they are known, to protect their intellectual property (IP) from misuse. They allow the data owner to recover damages for unlicensed use because they can use the watermark in a court of law as evidence of ownership and copyright infringement. The fact that such legal remedies exist deters individuals or groups hoping to acquire and then use that copyrighted material without permission from the owner.

Sadly, data leakage of text and database files, whether passed in the clear or decrypted at the point of use, has remained an unsolved problem. Owners of consumer data ("Data Owners") often give, lease, or sell their data to individuals or organizations ("Trusted Third Parties" or "TTPs") that are trusted to use that data only in a legal fashion, following contractual requirements or data-handling regulations, such as Regulation B in financial services, or privacy laws set by local, state or federal governments. This data is usually transmitted as a series of database tables (e.g., .sql format), text files (e.g., .csv, .txt, .xls, .doc, or .rtp format), or as a real-time data feed (e.g., XML or JSON). Despite this, it often occurs that the Data Owner's data leaks (the leaked file is defined herein as a "Leaked Subset") into the hands of others ("Bad Actors") who either knowingly or unknowingly use the data without proper permission or even illegally. This can happen because, for example, a TTP knowingly releases the data and is itself a Bad Actor; an employee of the TTP knowingly or accidentally releases the data; or an employee of the Data Owner itself knowingly or unknowingly leaks the data.

The inventors hereof believe that an ideal guilt assignment model would work through tracking the distribution history of unique attributes within datasets, and identification of potentially guilty TTPs along with determining their probability of having leaked the data. A guilt scoring method would be desirable that provides the following advantages not addressed by prior art methods of this type: the ability to identify the original recipient of the data; the ability to identify proprietary attributes within data files; and the ability to identify the date of original distribution of the data to the initial TTP.

DISCLOSURE OF INVENTION

The invention in certain implementations is directed to a guilt assignment model and scoring method that achieves the objectives outlined above. First, it serves a business function of data privacy and security. A "wild file" may be defined as a list of records of previously unknown origin potentially containing illegally distributed proprietary data. This file may be discovered from a myriad of sources. A "reference database of historical attributes" is then employed, which is an archived backlog of attributes, metadata and values. This database exists for data from all users of this guilt assignment service. The invention leverages a uniquely layered integration of data identification techniques that make weighted contributions to an overall cumulative guilt assignment score. It is geared toward businesses that sell or otherwise distribute proprietary data. The invention thus enables organizations to identify and assert ownership of textual data that has been distributed outside of their firewall in the clear (i.e., without encryption), either intentionally or unintentionally, and assign guilt to parties misusing the data.

The guilt assignment system and method generates a statistical probability that a specific TTP is, in fact, the Bad Actor that illegally distributed the data or that enabled the Bad Actor to illegally distribute the data. Assigning guilt is potentially difficult when there are thousands of TTPs who receive data from a Data Owner. Watermarking and fingerprinting would ideally yield 100% certainty as to the identity of the leaker. If done correctly, watermarking or fingerprinting will rule out most TTPs, and leave only a few potential likely suspects, each of whom has a different statistical likelihood of being the source of the leak. The guilt assignment service in certain implementations of the invention is designed in such a way as to maximize the statistical "distance" between each party so that one TTP is often found to be significantly more likely to have been the source rather than the others. The guilt assignment system is designed as a multi-layer information detection system that captures idiosyncratic patterns within a dataset and tracks the lineage of those patterns back to the initial recipient of the data. The guilt assignment system involves several layers of data analysis, each making a weighted contribution to an overall guilt score for all identified potential bad actors.

In certain implementations, the invention operates in multiple layers. In the individual layers, each layer contributes new information about a distinct feature of the data as it relates to the source data. In the interactive layers, each layer contributes toward minimizing the number of possible guilty parties or Recipient IDs. Some attributes within the data weigh more heavily in the guilt score than others.

These and other features, objects and advantages of the present invention will become better understood from a consideration of the following detailed description of the preferred embodiments and appended claims in conjunction with the drawings as described following:

BEST MODE FOR CARRYING OUT THE INVENTION

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein. Although watermarking and fingerprinting adopts a layered approach for data protection guilt detection does not depend on the existence of a particular layer. A wild file could be detected with any level of guilt in one or more layers.

As a first line of protection against data leakage, a customer-specific watermarking mechanic is applied. First, unique Recipient IDs are generated and one is randomly assigned to each client in the database. The length of the Recipient ID can be any length as long as it is long enough to guarantee uniqueness.

Figure 1:
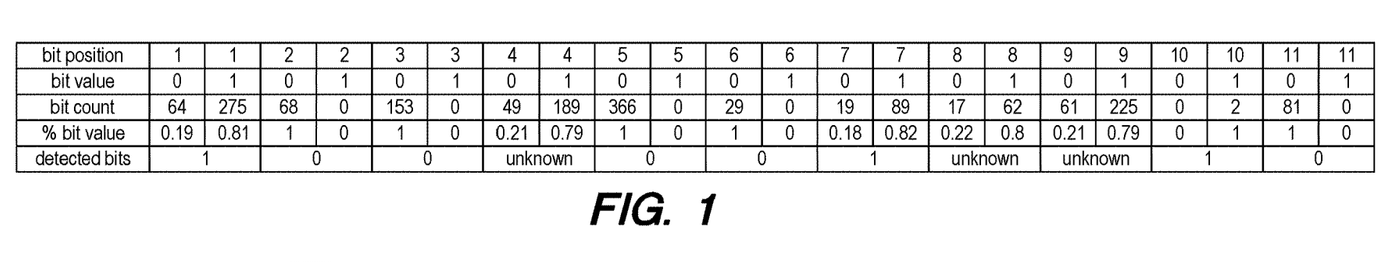
FIG. 1 is a chart showing bit observation counts in an example using an embodiment of the present invention.

Layer 1, watermark detection, proceeds in the following manner. Salting is the mechanic of inserting unique data (salt) into a subset of data so that, in the case that the data is leaked, the data contained in the subset of data may be identified back to the data owner. The salt is linked with this recipient-specific ID. Upon receipt of a dubious wild file, the salt is checked for by kicking off a search protocol that yields a set of counts ("Bit Count") associated with 0 and 1 ("Bit Value") for each bit position ("Bit Position") in the Recipient ID. A predefined heuristic, such as but not limited to a 80-20 heuristic, is applied to determine whether that bit position should be assigned to a 0, 1, or unknown based on the counts associated with each bit value. That is, a bit value is assigned as 1 or 0 if 80 percent or more of the counts for a given bit position are associated with that bit value ("Percent Bit Value"). In any bit position where neither bit has 80 percent of counts, it is considered as unknown ("Detected Bits"). FIG. 1 provides an illustrative example of this method applied to 11 bit positions.

Detected Recipient IDs will have variable numbers of recovered bits. If a Recipient ID is detected with fewer than 10 bits, it is not included in the Recipient ID pool because the probability of randomly matching up to 10 bits is roughly 0.1%. Therefore, if a Recipient ID is considered to be "recovered" during the watermark detection layers, the data owner has a greater than 99.9% confidence about the customer to whom it first distributed the data in question. The Recipient IDs detected during the watermark detection phase comprise the initial pool of suspected guilty TTPs.

After initial watermark detection (layer 1), the probability of guilt is 100 divided by the number of detected Recipient IDs. This value is then weighted based on information about number of bits matched in the detected Recipient ID. For example, if there are 3 Recipient IDs detected in the salt, the initial guilt score assigned to each Recipient ID is 33. This value is then weighted by a factor associated with the number of bits matched to the Recipient ID during detection. All Recipient IDs are matched up to at least 11 bits as a criterion for detection, but probabilities of matching more than 11 bits decrease drastically as the number of bits increases. A bin-based weighting metric is applied whereby Recipient IDs matched between 11 and 20 are weighted by a specific value (e.g., 1.1), IDs matched between 21 and 30 bits are weighted by a different value (e.g., 1.35), and IDs with more than 30 matched bits are weighted by a third value (e.g., 1.55). Given guilt score weights are tied to bit match ratios, Recipient IDs with more bits matched are assigned a higher guilt score by the end of layer 1 processing. For instance, in a pool of three detected Recipient IDs, if a Recipient ID had 12 bits matched, it would receive a weighted guilt score of 36.3, a Recipient ID with 25 bits matched would receive a weighted guilt score of 45, and a Recipient ID with 35 bits matched would receive a weighted guilt score of 51 by the end of layer 1 (initial watermark detection).

Moving to layer 2 (advanced watermark detection), another search process for detecting additional salt-related patterns embedded in the data prior to distribution to the customer is commenced. The method for the search process is the same as in the initial watermark detection procedure, but is applied to other data values, and it yields the same types of bit strings as depicted in FIG. 1. The bit strings are matched to the same pool of Recipient IDs as is used in layer 1. By matching to the same Recipient ID pool and hence the customer-data links, layer 2 increases the pool of suspected bad-acting TTPs.

After advanced watermark detection (layer 2), the guilt score is computed for every detected Recipient ID. In the event the same Recipient IDs are implicated in both layers 1 and 2, layer 2 yields an increase in the probability of guilt and therefore the guilt score for TTPs associated with those Recipient IDs. In other words, duplicate recipient IDs are weighted in accordance with their frequency in the Recipient ID pool. For instance, if 2 more IDs are added to the Recipient ID pool at the end of layer 2 and they are the same as the two IDs having 25 and 30 bits matched in layer 1, the base guilt score for those Recipient IDs is 40 and for the Recipient ID represented only once in the pool, the base guilt score is 20. Factoring weights into the guilt score using the same example weighting metrics as described in the above (1.1, 1.35, and 1.55) and the same number of recipient ID bits (40), the resulting guilt scores for the three Recipient IDs after layer 2 are 54 and 62 for the 25 and 30 bit matched Recipient IDs, respectively. In this scenario, the guilt score for the Recipient ID having 12 matched bits is 44.

After advanced watermark detection, a third layer of analysis is applied wherein the statistical distribution of data in the wild file is compared to distributions within corresponding data in the reference database. This is referred to herein as level 3, statistical profile detection. The Recipient ID pool resulting from Layer 2 serves as a list of suspected bad-acting TTPs. Using information contained within the wild file, a date range is identified within which the data must have been distributed.

Figure 2:
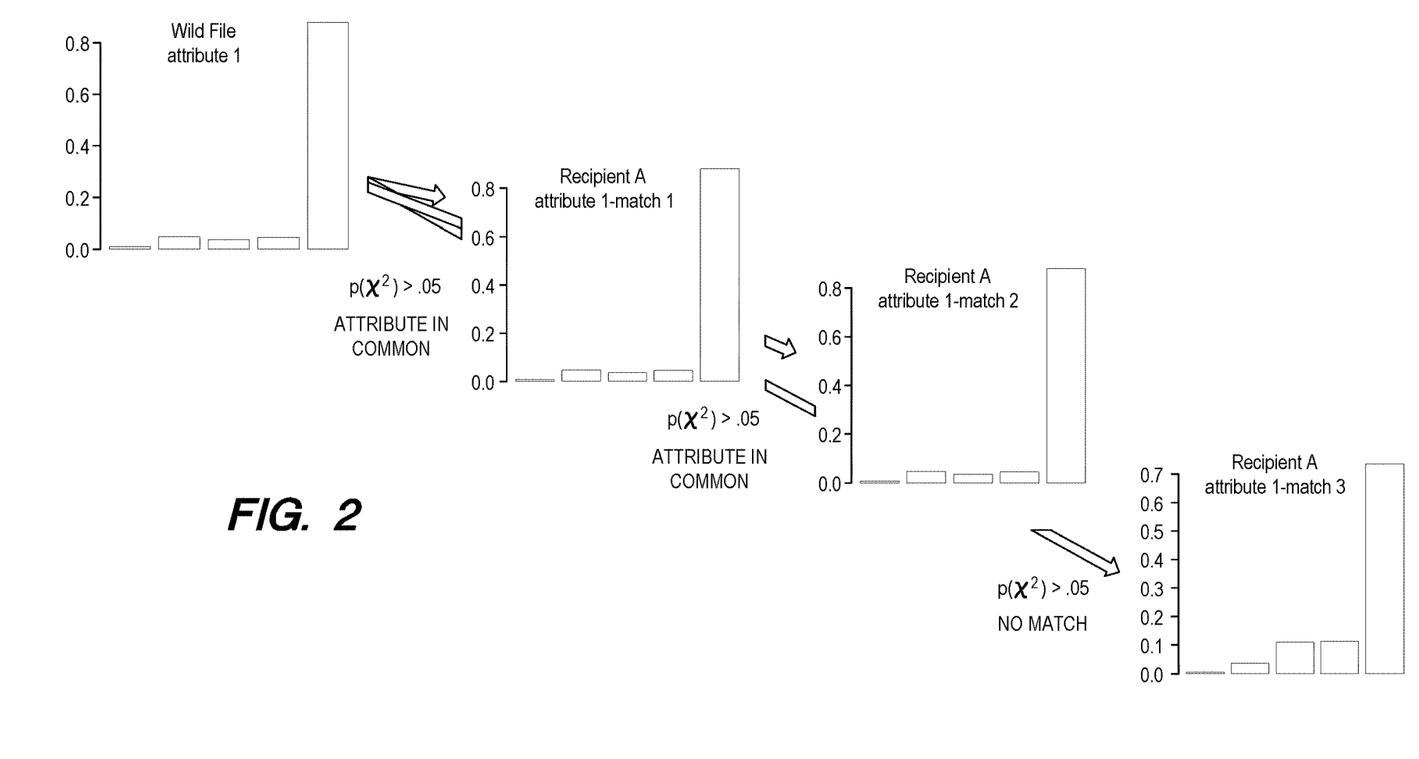
FIG. 2 is an illustration of the application of a chi-square goodness of fit test to match attributes in data files using an embodiment of the present invention.

The method for statistical profile detection in level 3 proceeds as follows:

1) Records in the wild file are matched with those in each of the suspected TTPs associated with suspected Recipient ID files with available personally identifying information in the wild file (e.g., name and address). Only matching records are evaluated further (in step 4). In the case where layer 1 and 2 does not yield any suspected Recipient ID, the system uses the company's master data file, Data Owner Set, for detection of layer 3 fingerprints.
2) A number of matching mechanics are employed including but not limited to meta-characteristics such as value type, number of values, value names and fill rate, etc.

of each wild file column's data, which are used to match with attributes in the reference database (see FIG. 2).

3) Chi-square ($\chi^2$) Goodness of Fit analysis is applied to compare each column of the wild file with each attribute in the reference file with matching meta-characteristics. Chi-Square Goodness of Fit analysis is a statistical test that can be used to determine if categories within datasets are distributed in the same way and therefore presumed to come from the same 'population' or, in this case, represents the same attribute. A resulting $\chi^2$ statistic with p-value of less than 0.05 in this context suggests the wild file attribute is 95% likely to be the same attribute as in the TTP recipient file. This is considered an attribute match in this example, and the TTP recipient file attribute is added to the subset of data subject to further comparison. Different p-value cut-offs may be employed in alternative embodiments of the invention. The comparison process iterates over every attribute in the wild file and across all potential source files yielding a set of attributes-in-common with the wild file for data distributed to every suspected bad actor in the Recipient ID pool. FIG. 2 is an example of how $\chi^2$ goodness of fit analysis is used to match attributes in the wild file with attributes in the TTP recipient files.

Figure 3:
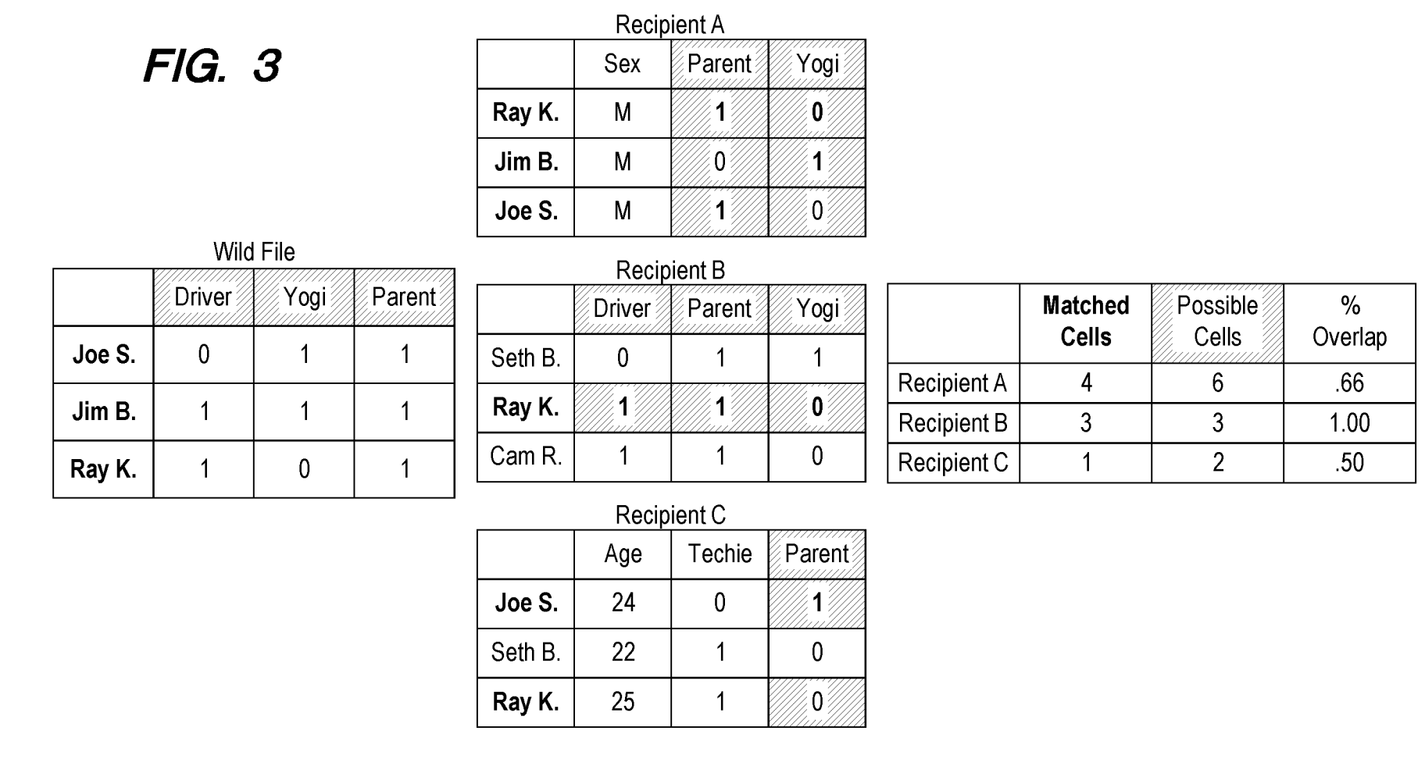
FIG. 3 is a schematic showing the comparison of wild file data against reference data in an example using an embodiment of the present invention.

4) The subset of matched records and matched attributes in the TTP recipient files (as shown in FIG. 3) is subject to further guilt assessment analysis. Data in each cell of the wild file is compared with data in each record and attribute-matched cell of the recipient vendor files as displayed in FIG. 3.

5) For each potential Bad Actor, a value is obtained that represents the number of columns in the wild file that were statistically matched in each source file for each suspected bad actor, the number of rows in the wild file that were matched via name and address in each source file, and the number of cells in the wild file that had the same value as the cell in the source files. The total number of possible cell matches is then computed by multiplying the number of matched rows by the number of matched columns and then compute the number of matching cell values.

6) The number of matching cell values is then weighted by an attribute-specific factor that is tied to historical information about attribute/column distribution frequency, proprietary status, and distinct attribute features. This information is stored in the attribute reference database. Attribute weights range from 0 to 1 with 0 being assigned to relatively more frequently distributed attributes such as 'age' or 'gender' and 1 being assigned to attributes that, for instance, are rarely distributed or contain header or value labels explicitly linked to known proprietary data. During layer 3 guilt score computation for a single attribute, the attribute-based weight, which is greater than 1 for less frequent attributes, is multiplied by the total number of cell matches. Similarly, attributes with proprietary header names or value labels are weighted greater than 1. In this way, detection of data from some attributes adds more weight to the guilt score than others.

Figure 4:
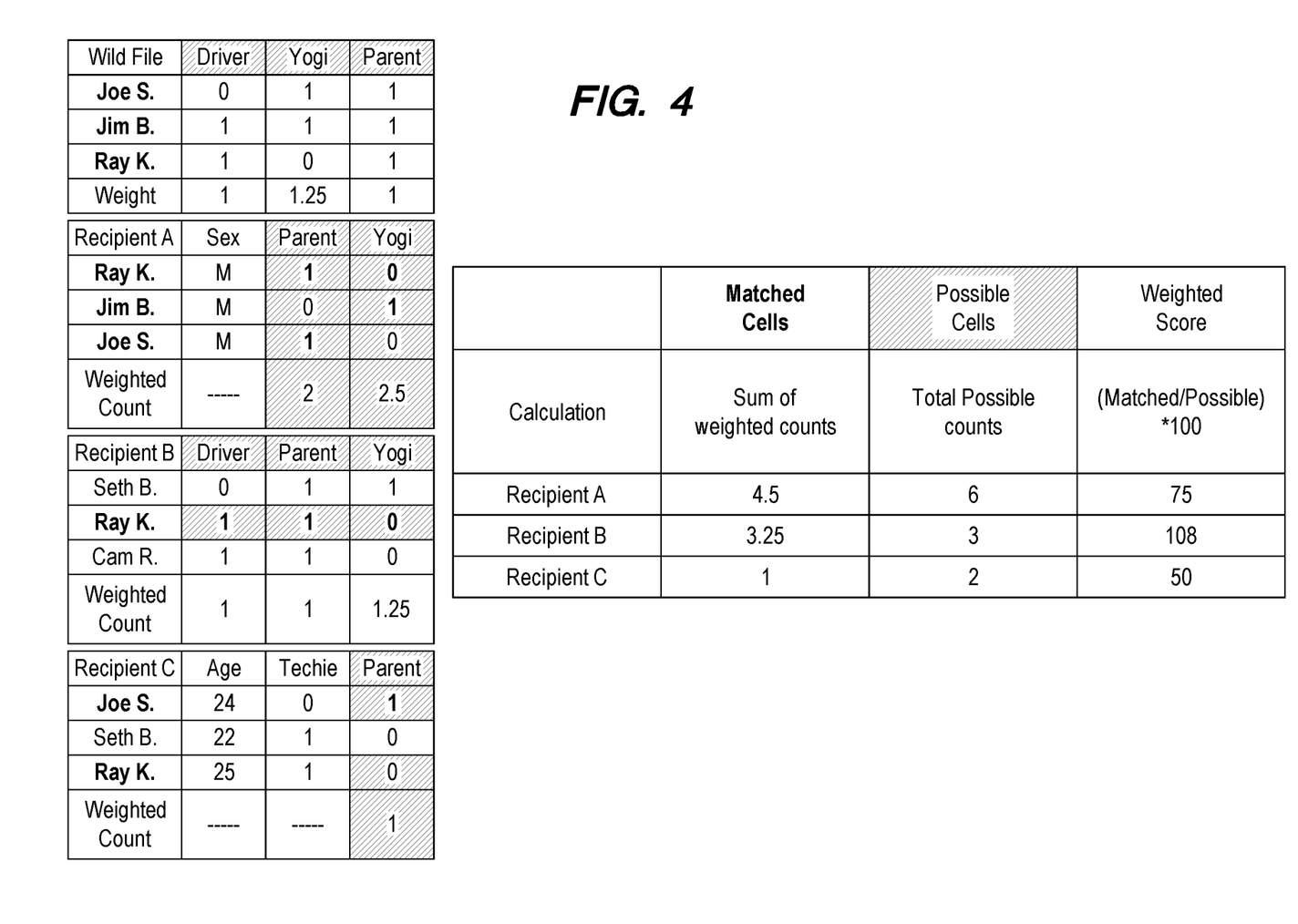
FIG. 4 is a set of tables showing weighted and non-weighted attributes during a statistical profile assessment in an example using an embodiment of the present invention.

As an example, in FIG. 3 there are six different attributes that are represented across the 4 files (1 wild file and 3 recipient files): 'Driver', 'Yogi', 'Parent', 'Sex', 'Age', and 'Techie'. Three of these attributes exist in the wild file ('Driver', 'Yogi', and 'Parent') and are therefore important factors in assessing the guilt of the recipient files. The 'driver' and 'parent' attributes are more often distributed to TTPs than is the 'yogi' attribute. Therefore, in this context, data determined to be from the 'yogi' attribute (in layer 3) carries a stronger weight in the guilt score than data determined to be 'driver' and 'parent' attributes. FIG. 4 depicts the attribute-weighted guilt score computation built from the scenario of FIG. 3.

The guilt assignment mechanics for layer 4 fingerprinting, PCAMix, are documented below. A process for performing PCAMix fingerprint is disclosed in international patent application no. PCT/US2017/062612, entitled "Mixed Data Fingerprinting with Principal Components Analysis."

The wild file is processed with those in each of the suspected TTPs associated with suspected Recipient ID files with available personally identifying information in the wild file (e.g., name and address). Only matching records are evaluated further. In the case where layer 1 and 2 does not yield any suspected Recipient ID, the system uses the company's master data file, Data Owner Set, for detection of layer 4 fingerprints. The Data Owner Set will be used as an example to illustrate the guilt score calculation below.

1) The vector of eigenvalues is produced for Data Owner Set and Wild File as Data Owner Eigenvalues and Wild File Eigenvalues, respectively. This gives the eigenvalue, the amount of variance explained by the associated eigenvector, and the cumulative variance explained. If there are correlations among the original variables, the eigenvalues will show that a reduced set of eigenvectors accounts for most of the variance in the data set, while those accounting for minor amounts of variance can be discarded or ignored for purposes of subsequent analyses. The eigenvector matrix is produced for the Data Owner and Wild File as Data Owner Eigenvectors and Wild File Eigenvectors, respectively. These matrices are a compressed signature for the dataset, or rather, the subset of variables it is based on. There are as many eigenvectors as there are original variables. Each eigenvector is a vector with elements that are weights of the original variables. The weights indicate the importance of particular variables in different eigenvectors. If the datasets are identical, the eigenvector matrices will be identical. If they are not identical, the two eigenvector matrices will differ.

2) The next step is score generation. The matrix of eigenvector scores is produced for the Data Owner Set and Wild File. Just as each observation has values for the original variables, they also have a score for each one of the eigenvectors. Similarity score is the output from the comparison of eigenvalues from the Data Owner Set and Wild File. If both analyses have been performed on the same observations and variables, the eigenvalues should be more or less identical if the files are the same. In this case the score for layer 4 is 1.

3) If not 1 or very close to it, they should not exhibit statistically significant differences. In this case we will score per eigenvalue when eigenvalues are equal or above 0.8. That is, if the eigenvalue is 0.85 the score will be 0.85. When the eigenvalue is less than 0.8, then the score for layer 4 is 0.

After the final assessment layer, we compute the average of guilt scores across all layers, which have been detected with a score, for each recipient file or Data Owner Set. This value is then subject to a final weighting based on a predetermined recipient risk profile score. The risk profile score is an integer value range, for example 1 to 4, and represents the risk of distributing data to a TTP company. The risk profile score derives from an analysis of several factors regarding a company's financial and/or credit history, operational practices, and additional characteristics that contribute to potential liability associated with distributing valuable data to a company. The lowest profile score (i.e., 1) is associated with the highest level of trustworthiness or lowest risk and the highest value score (i.e., 4) suggests a company has a low level of trustworthiness or highest risk. Companies receiving a risk score of 1 or companies with no information on file receive no additional weighting after the final layer of guilt assignment. Companies receiving a risk score of 4 receive the strongest weighting after the final layer of guilt assignment. In all cases, if the risk score is greater than 1, the risk profile weight will increase the guilt score for a given TPP recipient.

Figure 5:
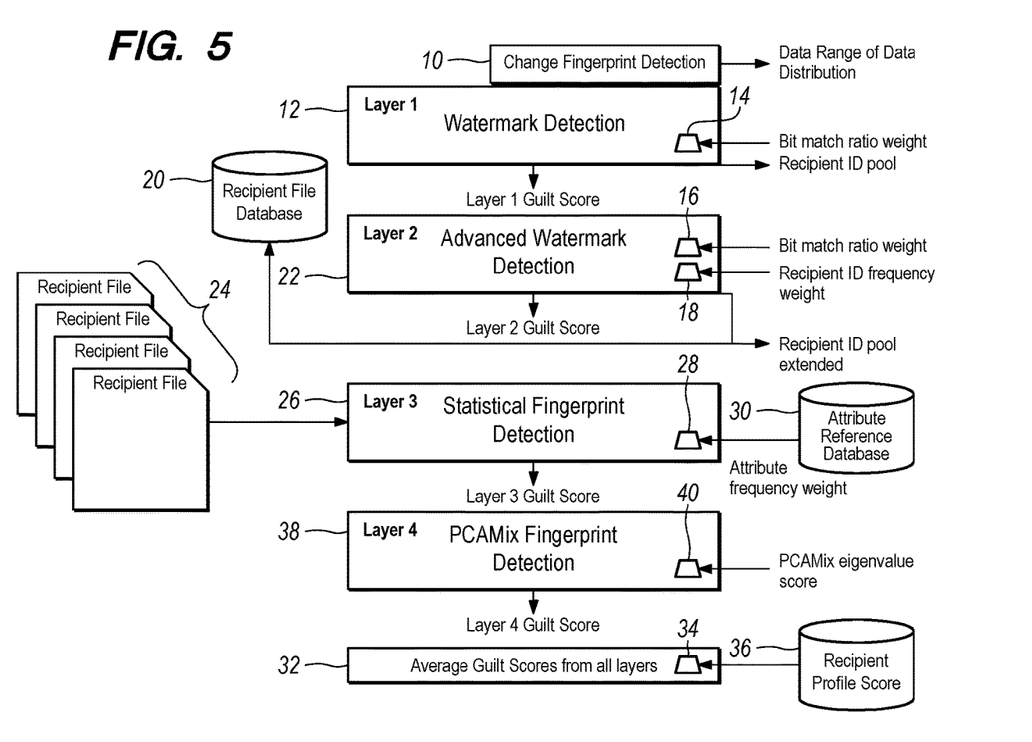
FIG. 5 is a data flow diagram for an embodiment of the present invention.

The output of this guilt assignment process is a list of suspected guilty TTPs, each with a guilt score that represents the relative guilt potential for leaking the file in question. FIG. 5 depicts the flow of information through the guilt assessment model and guilt score weight adjustments throughout the layers of the guilt assessment process. If multiple recipient IDs are detected in layers 1 and 2, the cumulative guilt score is also used to rank the relative guilt potential among TTPs.

Referring now to FIG. 5 to describe the process in overview, watermark detection at layer 1 occurs at block 12, with the input change fingerprint detection 10 as an input. Bit match ratio weight calculations 14 are computed as shown in the example of FIG. 1 and described above. Processing proceeds to advanced watermark detection at layer 2, occurring at block 22, using a separate bit match weight 16 and recipient ID frequency weight 18, calculated as described above. It may be noted that the recipient IDs are pulled from a recipient file database 20, which is comprised of all of the separate recipient files 24. Moving to statistical profile fingerprint detection layer 3 at block 26, recipient file database 20 is an input to this processing, as well as attribute reference database 30. Attribute reference database 30 is used to build attribute frequency weight 28. Moving to PCAMix fingerprint layer 4 at block 38, matched individual records and matched attributes are input to this processing. The PCAMix eigenvalue score 40 is received as an input, the function being as described above. Process then moves to the additional weight factors that lead to an overall guilt score at block 32. Inputs here include the recipient profile score database 36 as well as average guilt scores from previous layers; the recipient profile score database 36 is used to compute recipient legitimacy weight 34. The output is an overall guilt score from overall guilt score layer at block 32.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for measuring guilt with respect to a suspected leaked wild file, comprising the steps of:

a. performing a first search for one of a plurality of salts in the wild file, wherein each salt is associated with a recipient ID, each of which in turn is associated with a recipient data file, the first search resulting in a set of bit counts, each comprising a bit value for each bit position in the recipient ID;

b. applying a predetermined heuristic to each bit position to assign a heuristic value for each bit value to determine a first calculation of suspected guilty trusted third parties (TTPs);

c. dividing the probability of guilt for each suspected guilty TTP by the number of suspected guilty TTPs;

d. weighting the probability of guilt for each suspected guilty TTP by a factor associated with the number of bits matched to the recipient ID during detection to produce a first guilt score;

e. applying a second search for one of a plurality of salts in the wild file;

f. calculating a second guilt score for the suspected leaked wild file for each recipient file associated with a detected recipient ID;

g. increasing the weight of recipient IDs detected after both the first and second searches;

h. comparing the statistical distribution of data in the suspected leaked wild file to recipient files corresponding to the detected recipient IDs to produce a third guilt score;

i. applying mixed data fingerprinting with principal components analysis to the wild file to produce a fourth guilt score;

j. calculating a final guilt score by averaging the previously calculated first, second, third, and fourth guilt scores.

2. The method of claim 1, wherein the predetermined heuristic is an 80-20 heuristic.

3. The method of claim 2, wherein the heuristic value is chosen from the set consisting of 1, 0, and unknown.

4. The method of claim 3, wherein if the number of recovered bit values is less than a minimum bit value, not including the recovered bit values in a pool of recipient IDs associated with recipient files suspected to have been leaked.

5. The method of claim 4, wherein the step of weighting the probability of guilt for each suspected guilty TTP by a factor associated with the number of bits matched to the recipient ID during detection comprises the application of a bin-based weighting metric.

6. The method of claim 5, wherein the bin-based weighting metric is a first specific value for recipient IDs matched for a total of between 11 and 20, a second specific value for recipient IDs matched for a total of between 21 and 30, and a third specific value for IDs matched for a total of more than 30.

7. The method of claim 5, wherein the bin-based weighting metric for both the first and second searches is added together to create a total bin-based weighting metric.

8. The method of claim 1, wherein the step of comparing the statistical distribution of data in the suspected leaked file to files corresponding to the detected recipient IDs further comprises the step of identifying a data range from which data must have been distributed in the suspected leaked file.

9. The method of claim 8, wherein the step of comparing the statistical distribution of data in the suspected leaked file to files corresponding to the detected recipient IDs comprises the step of comparing record fields in the files corresponding to detected recipient IDs to records in the suspected leaked file, and eliminating recipient files corresponding to any detected recipient IDs for any non-matching files.

10. The method of claim 9, wherein the step of comparing the statistical distribution of data in the suspected leaked file to files corresponding to the detected recipient IDs comprises the step of matching meta characteristics between recipient files corresponding to the detected recipient IDs and the suspected leaked wild file.

11. The method of claim 10, wherein the meta-characteristics comprise at least one of value type, number of values, value names, and fill rate.

12. The method of claim 10, wherein the step of comparing the statistical distribution of data in the suspected leaked file to files corresponding to the detected recipient IDs further comprises the step of performing a chi-square goodness of fit analysis with at least one attribute in the reference file corresponding to reach recipient ID with matching meta-characteristics.

13. The method of claim 12, further comprising the step of comparing values in attribute-matched cells between the suspected leaked wild file and recipient files corresponding to matched recipient IDs to obtain a number of matched columns.

14. The method of claim 13, further comprising the step of calculating a total number of possible cell matches by multiplying the total number of matched columns by a number of matched rows to yield a number of matching cell values.

15. The method of claim 14, further comprising the step of weighting each of the matching cell values by an attribute-specific factor tied to historical information.

16. The method of claim 15, wherein the historical information comprises at least one of attribute/column distribution frequency, proprietary status, and distinct attribute features.

17. The method of claim 1, wherein the final guilt score is weighted based on a predetermined recipient risk profile score.

18. The method of claim 17, wherein the predetermined recipient risk profile score comprises an integer value range.

19. The method of claim 18, wherein the integer value range of the predetermined recipient risk profile score is derived from a plurality of factors comprising one or more of a recipient's financial and/or credit history, operational practices, and additional characteristics that contribute to potential liability associated with distributing data.

\* \* \* \* \*